(12) United States Patent
Mechi et al.

(10) Patent No.: US 8,970,066 B2
(45) Date of Patent: Mar. 3, 2015

(54) HYBRID ELECTRIC-POWER SUPPLYING SYSTEM

(75) Inventors: Abdallah Mechi, Shiga (JP); Sumikazu Matsuno, Shiga (JP)

(73) Assignee: Daikin Industries, Ltd., Osaka-Shi (JP)

( * ) Notice: Subject to any disclaimer, the term of this patent is extended or adjusted under 35 U.S.C. 154(b) by 576 days.

(21) Appl. No.: 13/390,878

(22) PCT Filed: Apr. 27, 2010

(86) PCT No.: PCT/JP2010/057438
§ 371 (c)(1),
(2), (4) Date: Feb. 16, 2012

(87) PCT Pub. No.: WO2011/024517
PCT Pub. Date: Mar. 3, 2011

(65) Prior Publication Data
US 2012/0146422 A1    Jun. 14, 2012

(30) Foreign Application Priority Data

Aug. 31, 2009 (JP) ................. 2009-199462

(51) Int. Cl.
| H02J 3/00 | (2006.01) |
| B60L 1/00 | (2006.01) |
| B60L 11/12 | (2006.01) |
| B60L 11/18 | (2006.01) |
| H02P 25/18 | (2006.01) |
| H02P 1/30 | (2006.01) |

(52) U.S. Cl.
CPC . *B60L 1/00* (2013.01); *B60L 11/12* (2013.01); *B60L 11/1811* (2013.01); *B60L 11/1812* (2013.01); *B60L 11/1814* (2013.01); *H02P 25/184* (2013.01); *H02P 1/30* (2013.01); *Y02T 10/7005* (2013.01); *Y02T 10/7077* (2013.01); *Y02T 10/7088* (2013.01); *Y02T 90/127* (2013.01); *Y02T 90/14* (2013.01); *B60L 2220/54* (2013.01); *Y02T 10/641* (2013.01); *Y02T 10/642* (2013.01)
USPC .............................................. 307/80; 307/68

(58) Field of Classification Search
USPC ..................................................... 307/80, 68
See application file for complete search history.

(56) References Cited

U.S. PATENT DOCUMENTS

| 4,460,834 | A | * | 7/1984 | Gottfried | ...................... 307/64 |
| 7,068,014 | B2 | * | 6/2006 | Gabrys | ........................... 322/4 |
| 7,589,438 | B2 | * | 9/2009 | Galm | ........................... 307/127 |

FOREIGN PATENT DOCUMENTS

| EP | 0 603 778 A1 | 6/1994 |
| JP | 48-34422 B | 10/1973 |
| JP | 2000-152408 A | 5/2000 |
| JP | 2003-189684 A | 7/2003 |

* cited by examiner

*Primary Examiner* — Rexford Barnie
*Assistant Examiner* — Dru Parries
(74) *Attorney, Agent, or Firm* — Birch, Stewart, Kolasch & Birch, LLP (57) ABSTRACT

In a plug-in operation, a first winding which functions as an armature winding for supplying an R-phase current of a three-phase rotary electric machine, a third winding, and a second winding are connected respectively to terminals for supplying R-phase, S-phase, and T-phase currents of a three-phase power source. Thus, the S-phase current and the T-phase current are interchanged as compared with in a normal operation. Thereby, reverse rotation of a field element is intentionally caused. A reverse-rotation prevention mechanism is provided in the field element.

4 Claims, 6 Drawing Sheets

HYBRID ELECTRIC-POWER SUPPLYING SYSTEM

TECHNICAL FIELD

The present invention relates to a hybrid electric-power supply system, and particularly to a hybrid electric-power supply system in which an armature winding of a rotary electric machine is used as a reactor of a three-phase AC power source.

BACKGROUND ART

Figure 8:
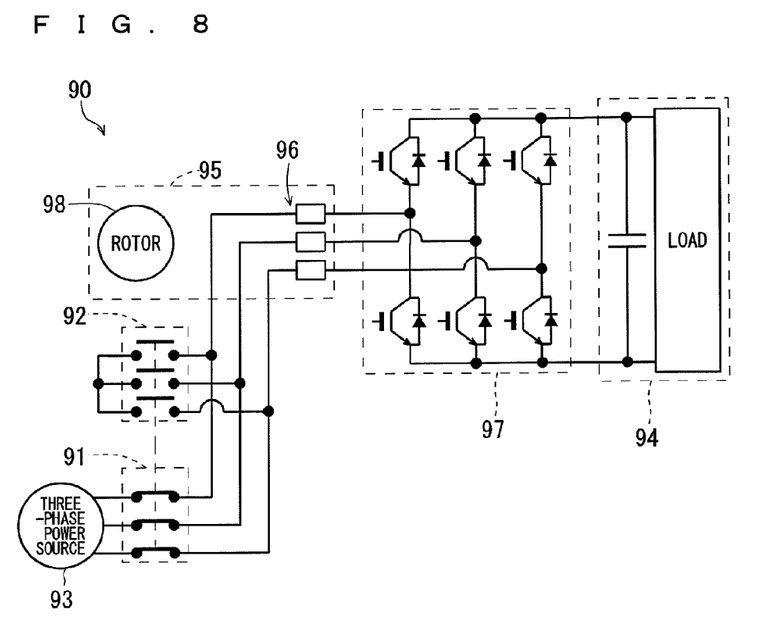
FIG. 8 is a diagram conceptually illustrating a conventional hybrid electric-power supply system.

FIG. 8 is a diagram conceptually illustrating a conventional hybrid electric-power supply system 90. For example, an electric vehicle, a refrigerated trailer, or the like, adopts the hybrid electric-power supply system 90 as shown in FIG. 8. The electric vehicle is disclosed in, for example, Japanese Patent Application Laid-Open No. 2000-152408 mentioned below.

In this hybrid electric-power supply system 90, when all switches 91 are conducting and all switches 92 are non-conducting, a three-phase power source 93 supplies three-phase AC power to a load 94 (an operation in such a connection relationship will be referred to as "plug-in operation"). When all the switches 91 are non-conducting and all the switches 92 are conducting, a power generator 95 supplies three-phase AC power generated by itself to the load 94 (an operation in such a connection relationship will be referred to as "normal operation").

SUMMARY OF THE INVENTION

Problems to be Solved by the Invention

During the plug-in operation, a converter 97 is operated using inductance of an armature winding 96 provided in the rotary electric machine 95. When the converter 97 is driven, a large amount of current flows in the armature winding 96. This may cause a rotor 98 to rotate, and consequently the rotary electric machine 95 or an engine for driving it may be significantly damaged. Although it may be conceivable to provide the rotary electric machine 95 or the engine with a mechanism for allowing such a rotation during the plug-in operation, such a mechanism being simply applied acts as a load in the normal operation and thus a fuel cost may increase. Additionally, if the rotor rotates during the plug-in operation, excessive power is supplied to the armature winding, which is inefficient.

In view of the problems described above, an object of the present invention is to provide a technique for avoiding or suppressing a damage to a rotary electric machine which may be provoked during a plug-in operation.

Means for Solving the Problems

To solve the above-described problems, a first aspect of a hybrid electric-power supply system according to the present invention includes: a three-phase rotary electric machine (10) including an armature (12) serving as a stator and a field element (14) serving as a rotor, the armature having first to third windings (12A, 12B, 12C) corresponding to first to third different phases (1R, 1S, 1T), respectively; a converter (20) connected to the armature windings; a three-phase power source (30) including first to third terminals (30R, 30S, 30T) for supplying currents corresponding to the first to third phases, respectively; and a connecting part (40) for switching between a first state where the first to third windings are commonly connected to one another at the side thereof opposite to the converter, and a second state where the first terminal, the third terminal, and the second terminal are connected to the first armature winding, the second armature winding, and the third armature winding, respectively, wherein the first to third windings are not connected to one another within the three-phase rotary electric machine, and in the first state, power is fed to the converter by a normal rotation of the rotor, and in the second state, power is fed from the three-phase power source to the converter via the armature windings.

A second aspect of the hybrid electric-power supply system according to the present invention is the first aspect thereof, wherein: the connecting part (40) switches among the first state, the second state, and a third state where the first terminal (30R), the second terminal (30S), and the third terminal (30T) are connected to the first armature winding (12A), the second armature winding (12B), and the third armature winding (12C), respectively; in the third state, power is fed from the three-phase power source (30) to the converter (20) via the armature windings; and the hybrid electric-power supply system further comprises: a phase current determination section (70) for determining phase currents that flow in the first to third windings, respectively, due to rotation of the field element; and a switching part (72) for, when power is fed from the three-phase power source to the converter via the armature windings, switching the connecting part to the second state or the third state based on a result of the determination made by the phase current determination section.

A third aspect of the hybrid electric-power supply system according to the present invention is the first or second aspect thereof, wherein the field element (14) is fixed to a bearing (13), the bearing (13) includes: a shaft support portion (131) for supporting a shaft (11) that extends in a direction of a rotation axis (Q) and has, in an end portion (11e) thereof at one side with respect to the direction of the rotation axis, a thread (11g) threaded around the direction of rotation axis, the supporting is made so as to fix a position of the shaft with respect to the direction of the rotation axis and a direction perpendicular thereto while allowing the shaft to rotate around the rotation axis; and a threaded member (132) threadedly fastened to and released from the thread, the threaded member has its position fixed relative to the shaft support portion with respect to a circumferential direction centered at the rotation axis while the threaded member is allowed to move in the direction of the rotation axis only to a certain distance.

Effects of the Invention

In a hybrid electric-power supply system, an armature winding of a rotary electric machine is sometimes used as a reactor of a three-phase AC power source. In such a case, if a converter is driven by power supply from the three-phase AC power source (so-called "plug-in operation"), a current flowing in the armature winding may cause a rotor of the rotary electric machine to rotate. If the rotor rotates during the plug-in operation, excessive power is supplied to the armature winding, which is inefficient. In the first aspect of the hybrid electric-power supply system according to the present invention, a driving for intentionally causing the rotor to reversely rotate is performed in the plug-in operation. Since the reverse rotation prevention mechanism is provided in the rotor, rotation of the rotor can be suppressed by the reverse-rotation prevention mechanism. This can avoid or suppress a damage to the rotary electric machine which may be otherwise provoked during the plug-in operation. Additionally, the operation can be performed efficiently.

In the second aspect of the hybrid electric-power supply system according to the present invention, the invention is applicable irrespective of the phase of the current flowing in each of the armature windings while the converter is driven by the rotation of the rotor (so-called "normal operation").

In the third aspect of the hybrid electric-power supply system according to the present invention, the thread is threadedly fastened to the threaded member due to rotation of the shaft in one direction around the rotation axis. The threaded member is moved in the direction of the rotation axis by threaded engagement with the thread, but such movement is limited to the certain distance. Additionally, the position of the shaft is fixed with respect to the direction of the rotation axis. Therefore, rotation of the shaft in the one direction is blocked by the threaded fastening. Thus, providing the threaded member in such a manner that the threaded member is fastened if the shaft rotates in an unintended direction (reverse rotation) contributes to prevention of the reverse rotation. Moreover, in a case where the shaft rotates in the other directions, the thread is released from the threaded member. Therefore, in a case where the shaft rotates (normal rotation) in an intended direction, the normal rotation of the shaft is not blocked even after the reverse rotation is prevented.

These and other objects, features, aspects and advantages of the present invention will become more apparent from the following detailed description of the present invention when taken in conjunction with the accompanying drawings.

EMBODIMENT FOR CARRYING OUT THE INVENTION

Hereinafter, preferred embodiments of the present invention will be described with reference to the drawings. In the drawings referred to below, starting from FIG. 1, only elements related to the embodiments are shown.

Embodiment 1

Figure 1:
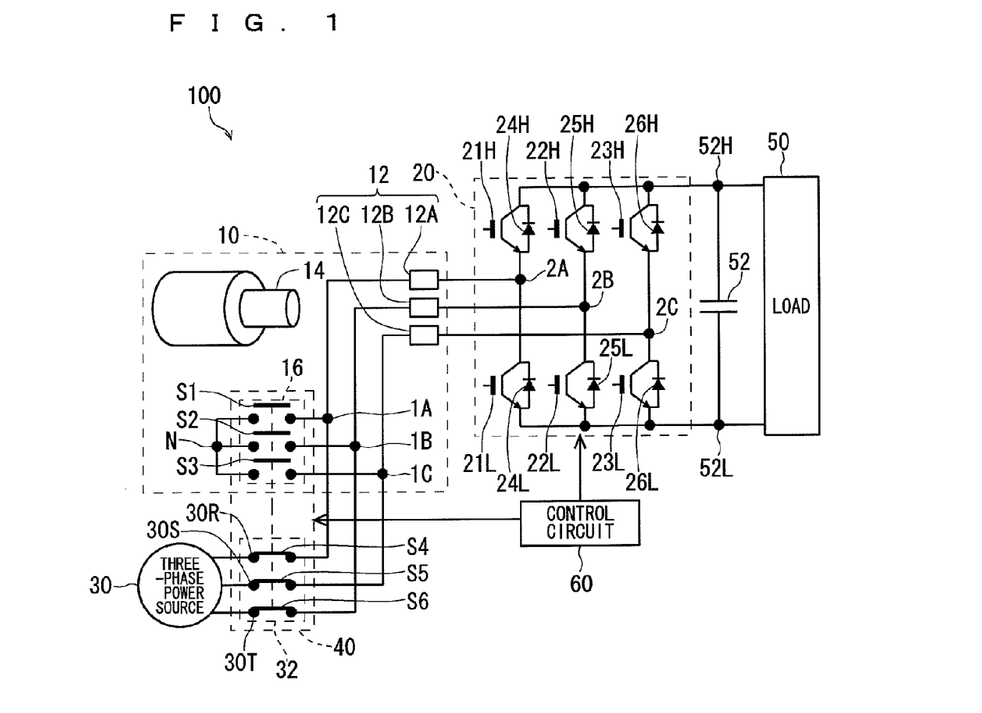
FIG. 1 is a diagram conceptually illustrating a hybrid electric-power supply system according to an embodiment 1.

As shown in FIG. 1, a hybrid electric-power supply system 100 according to an embodiment 1 includes a three-phase rotary electric machine 10, a converter 20, a three-phase power source 30, a connecting part 40, a load 50, and a control circuit 60. In this system, the connecting part 40 selects on of the three-phase rotary electric machine 10 and the three-phase power source 30 in which an armature winding 12 provided in the three-phase rotary electric machine 10 is used as a reactor. The selected one of them feeds power to the load 50 via the converter 20.

The three-phase rotary electric machine 10 includes an armature 12 serving as a stator, a field element 14 serving as a rotor, and a switching circuit 16. The armature 12 has a first winding 12A, a second winding 12B, and a third winding 12C. One ends 1A, 1B, and 1C of the first to third windings 12A, 12B, and 12C are connected to the switching circuit 16, and the other ends 2A, 2B, and 2C thereof are connected to the converter 20. The switching circuit 16 connects/disconnects the first to third windings 12A, 12B, and 12C to one another.

More specifically, the switching circuit 16 has switches S1, S2, and S3. The switch S1 is provided between the one end 1A of the first winding 12A and a neutral point N. The switch S2 is provided between the one end 1B of the second winding 12B and the neutral point N. The switch S3 is provided between the one end 1C of the third winding 12C and the neutral point N. When all the switches S1, S2, and S3 are in a conducting state, the first to third windings 12A, 12B, and 12C function as a star-connected armature winding. When all the switches S1, S2, and S3 are in a non-conducting state, the first to third windings 12A, 12B, and 12C are separated from one another.

The three-phase power source 30 adopts, for example, a commercial power supply, and has a first terminal 30R, a second terminal 30S, and a third terminal 30T for supplying currents (hereinafter referred to as "R-phase current", "S-phase current", and "T-phase current") corresponding to an R-phase, an S-phase, and a T-phase, respectively, of the three phases. The first to third terminals 30R, 30S, and 30T are connected to a switching circuit 32. Hereinafter, the switching circuit 16 will be referred to as "first switching circuit 16", and the switching circuit 32 will be referred to as "second switching circuit 32". The first switching circuit 16, and additionally the second switching circuit 32, may be built in the rotary electric machine 10.

The second switching circuit 32 has switches S4, S5, and S6. The switch S4 is provided between the one end 1A of the first winding 12A and the first terminal 30R of the three-phase power source 30. The switch S5 is provided between the one end 1C of the third winding 12C and the second terminal 30S of the three-phase power source 30. The switch S6 is provided between the one end 1B of the second winding 12B and the third terminal 30T of the three-phase power source 30. When all the switches S4, S5, and S6 are in a conducting state, the three-phase power source 30 supplies three-phase AC power to the converter 20. When all the switches S4, S5, and S6 are in a non-conducting state, the supply of the three-phase AC power from the three-phase power source 30 to the converter 20 is stopped.

The connecting part 40 switches between a first state and a second state that are mutually exclusive, which will be shown below. That is, the first state means a state where the first to third windings 12A, 12B, and 12C, and more specifically the one ends 1A, 1B, and 1C of the respective windings 12A, 12B, and 12C, are connected to one another to function as the armature winding. The second state means state where the first terminal 30R of the three-phase power source 30 is connected to the one end 1A of the first winding 12A, the third terminal 30T of the three-phase power source 30 is connected to the one end 1B of the second winding 12B, and the second terminal 30S of the three-phase power source 30 is connected to the one end 1C of the third winding 12C. In short, a state where the one ends 1A, 1B, and 1C of the windings 12A, 12B, and 12C are connected to one another is the first state, and a state where the one ends 1A, 1B, and 1C of the windings 12A, 12B, and 12C are connected to the terminals 30R, 30T, and 30S of the three-phase power source 30 is the second state.

That is, the first state means that all the switches S1, S2, and S3 of the first switching circuit 16 in the conducting state and additionally all the other switches (in this embodiment 1, the switches S4, S5, and S6 of the second switching circuit 32) are in the non-conducting state. The second state means that all the switches S4, S5, and S6 of the second switching circuit 32 are in the conducting state and additionally all the other switches (in this embodiment 1, the switches S1, S2, and S3 of the first switching circuit 16) are in the non-conducting state. Therefore, it can be considered that the connecting part 40 is implemented by a cooperative operation of the first switching circuit 16 and the second switching circuit 32.

A connection state (the first state or the second state) in the connecting part 40 is switched by the control circuit 60. The control circuit 60 has a computing element and a storage element (both not shown). The storage element stores therein a program executable by the hybrid electric-power supply system 100 and data necessary for controlling the hybrid electric-power supply system 100. The computing element executes a computing process based on the program and the data stored in the storage element, thus performing a control. The control circuit 60 performs not only a control on the connecting part 40 but also various controls such as outputting a gate signal of the converter 20.

In the first state, the field element 14 rotates in a predefined direction relative to the armature 12 (normal rotation), the R-phase current, the S-phase current, and the T-phase current are supplied from the first winding 12A, the second winding 12B, and the third winding 12C, respectively, to the converter 20. In the second state, the R-phase current, the T-phase current, and the S-phase current are supplied from the first winding 12A, the second winding 12B, and the third winding 12C, respectively, to the converter 20. In other words, in the second state, the S-phase and the T-phase are interchanged as compared with in the first state.

The converter 20 converts the AC power supplied from the other ends 2A, 2B, and 2C of the first to third windings 12A, 12B, and 12C into DC power, and supplies the DC power to the terminals 52H and 52L. In FIG. 1, for example, the converter 20 includes high-arm side switching devices 21H, 22H, and 23H, diodes 24H, 25H, and 26H that are reverse-connected in parallel with them, respectively, low-arm side switching devices 21L, 22L, and 23L, and diodes 24L, 25L, and 26L that are reverse-connected in parallel with them, respectively.

A smoothing capacitor 52 is connected between the terminals 52H and 52L. The DC power supplied to the terminals 52H and 52L is smoothed by the smoothing capacitor 52, and supplied to the load 50.

In the hybrid electric-power supply system 100 configured as described above, the following operation can be performed.

For example, by bringing all the switches S1, S2, and S3 of the first switching circuit 16 into the conducting state while bringing all the switches S4, S5, and S6 of the second switching circuit 32 into the non-conducting state (first state), the three-phase AC power (multiphase AC power) generated by the three-phase rotary electric machine 10 can be supplied to the load 50 (so-called "normal operation").

To be specific, a rotation operation of the field element 14 causes a three-phase AC voltage in the first to third windings 12A, 12B, and 12C. This three-phase AC voltage is supplied to the converter 20 via the other ends 2A, 2B, and 2C of the first to third windings 12A, 12B, and 12C, and converted into a DC voltage. This DC voltage is smoothed by the smoothing capacitor 52, and supplied to the load 50. At this time, the first to third windings 12A, 12B, and 12C function as the armature winding.

On the other hand, by bringing all the switches S1, S2, and S3 of the first switching circuit 16 into the non-conducting state while bringing all the switches S4, S5, and S6 of the second switching circuit 32 into the conducting state (second state), the three-phase AC power (multiphase AC power) of the three-phase power source 30 can be supplied to the load 50 (so-called "plug-in operation").

To be specific, the three-phase AC voltage from the three-phase power source 30 is supplied to the converter 20 via the first to third windings 12A, 12B, and 12C, and converted into a DC voltage. This DC voltage is smoothed by the smoothing capacitor 52, and supplied to the load 50. At this time, the first to third windings 12A, 12B, and 12C function as a reactor of the three-phase power source 30, though they function as the armature winding in the first state. This contributes to reduction in manufacturing costs.

In this manner, in the first state and the second state, the phase current flowing in the second winding 12S and the phase current flowing in the third winding 12T are interchanged. Therefore, in the plug-in operation, a force causing the field element 14 to rotate in a direction reverse to its rotation (normal rotation) direction in the first state is applied to the field element 14. Here, a configuration for blocking rotation of the field element 14 in the plug-in operation is employed by providing a reverse-rotation prevention mechanism.

For example, a reverse-rotation prevention mechanism as shown in FIGS. 2 to 5 is provided in the field element 14, and thereby rotation of the field element 14 can be suppressed. This can avoid supplying excessive power to the first to third windings 12A, 12B, and 12C, and enables an efficient operation of the load 50.

Figure 2:
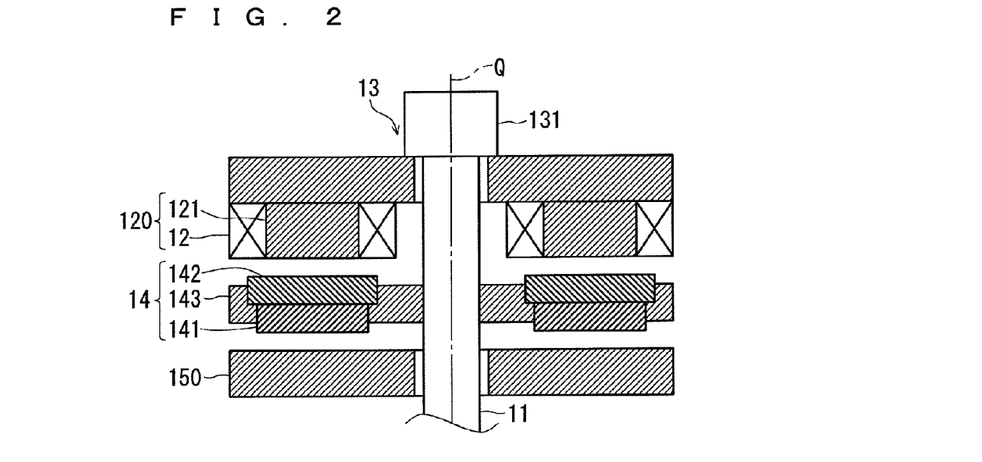
FIG. 2 is a cross-sectional view conceptually illustrating a three-phase rotary electric machine.

The three-phase rotary electric machine 10 includes a shaft 11 extending along a direction of a predefined rotation axis Q, a bearing 13 for holding the shaft 11, the field element 14 serving as a rotor fixed to the shaft 11, a first stator 120 having the armature winding 12, and a second stator 150 facing the field element 14 in an opposite side to the first stator 120 with respect to the field element 14. Each of the field element 14, the first stator 120, and the second stator 150 has a substantially disk-like shape.

The field element 14 has a permanent magnet 141 whose magnetic pole alternates in a circumferential direction centered at the shaft 11, and has a magnetic core 142 provided at the first stator 120 side of the permanent magnet 141. The permanent magnet 141 and the magnetic core 142 are held by a holder 143. The first stator 120 has an armature magnetic core 121 and the armature winding 12 provided at the side thereof facing the field element 14. Here, the armature winding 12 corresponds to each of the first to third windings 12A, 12B, and 12C shown in FIG. 1. The second stator 150 has no armature winding.

Figure 3:
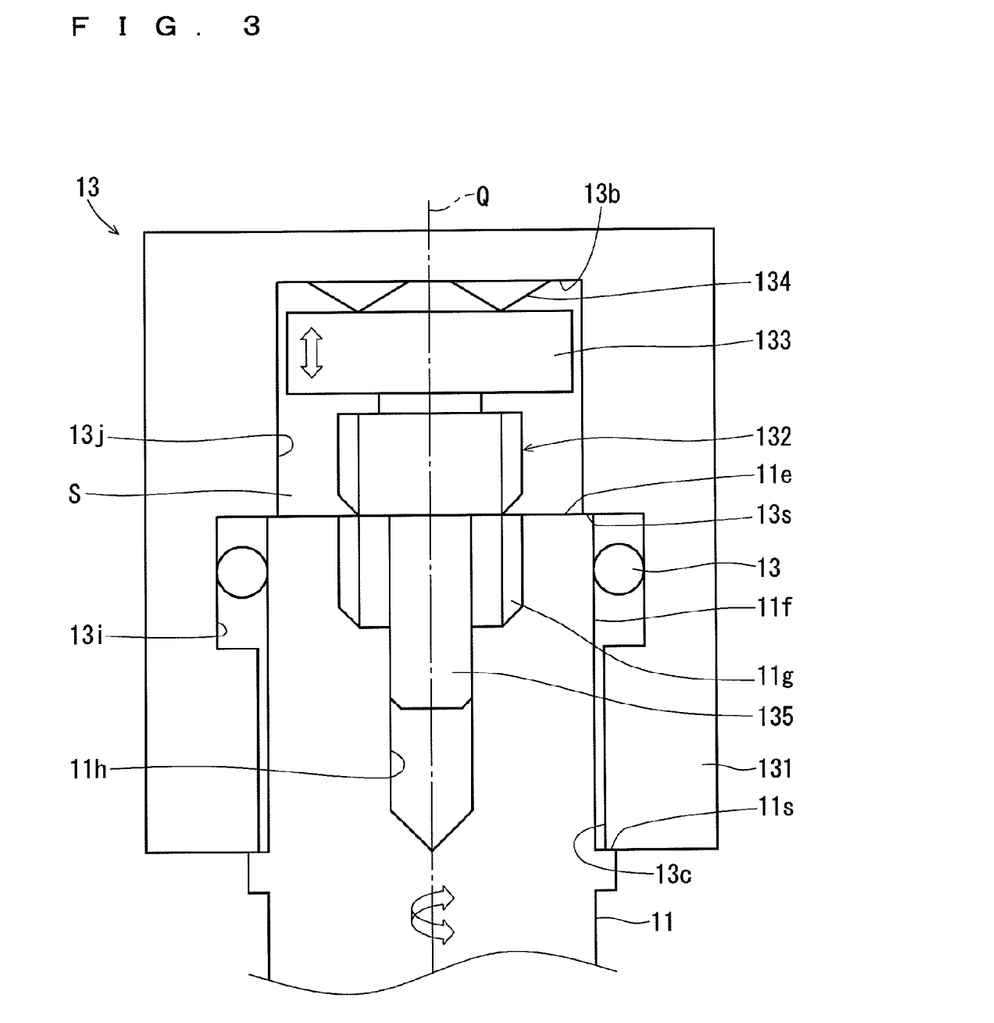
FIG. 3 is a diagram illustrating a cross-section of a bearing of the rotary electric machine.

As shown in FIG. 3, the bearing 13 includes a shaft support portion 131 for supporting the shaft 11, and a threaded member 132. An end portion of the shaft 11 at one side is supported on the shaft support portion 131, and an end portion thereof at the other side is supported on a bearing (not shown). The shaft support portion 131 is fixed to the first stator 120.

The shaft support portion 131 supports the shaft 11 in such a manner that the position of the shaft 11 is fixed in the direction of the rotation axis Q and in the direction perpendicular thereto while rotation of the shaft 11 around the rotation axis Q is permitted. In a specific example, the shaft support portion 131 shows a recess 13c that covers an end portion 11e of the shaft 11 at the one side and therearound, and is loosely fitted to the shaft 11 from the outside thereof. More specifically, bearing balls 13 are provided between a side surface 11f of the shaft 11 at the one side and, in the recess 13c, an inside wall 13i of the shaft support portion 131 which faces the side surface 11f. This allows the shaft support portion 131 to rotatably support the shaft 11.

A space S (that does not allow entry of the shaft 11 into it) having a rectangular prismatic shape defined by a step 13s shown in the recess 13c is formed between the end portion 11e of the shaft 11 and a bottom surface 13b of the recess 13c. In the space S, a rotation mechanism that contributes to prevention of the reverse rotation of the field element 14 (and in more detail, the shaft 11) is provided. The depth of the entry of the shaft 11 into the recess 13c may be defined by a step 11s shown in the shaft 11.

<Rotation Mechanism>

The shaft 11 extends in the predetermined direction of the rotation axis Q and has, in the end portion 11e thereof at the one end with respect to the direction of the rotation axis Q, a thread that is threaded around the direction of the rotation axis Q. In a specific example, the shaft 11 is shaped into a substantially circular column centered at the rotation axis Q, and has, in the end portion 11e at the one end side of the circular column (at the side where the shaft support portion 131 is provided), a female screw portion 11g that extends up to the predefined depth in the direction of the rotation axis Q.

The threaded member 132 is provided in the space S formed between the end portion 11e and the bottom surface 13b. In a case where the end portion 11e of the shaft 11 has the female screw portion 11g, the threaded member 132 employs a male screw (hereinafter referred to as "male screw 132") that is threadedly fastened to or released from the female screw portion 11g. That is, the diameter of the male screw 132 is substantially equal to the diameter of the female screw portion 11g, and a thread groove is formed with a pitch equal to the pitch of the female screw portion 11g.

Figure 4:
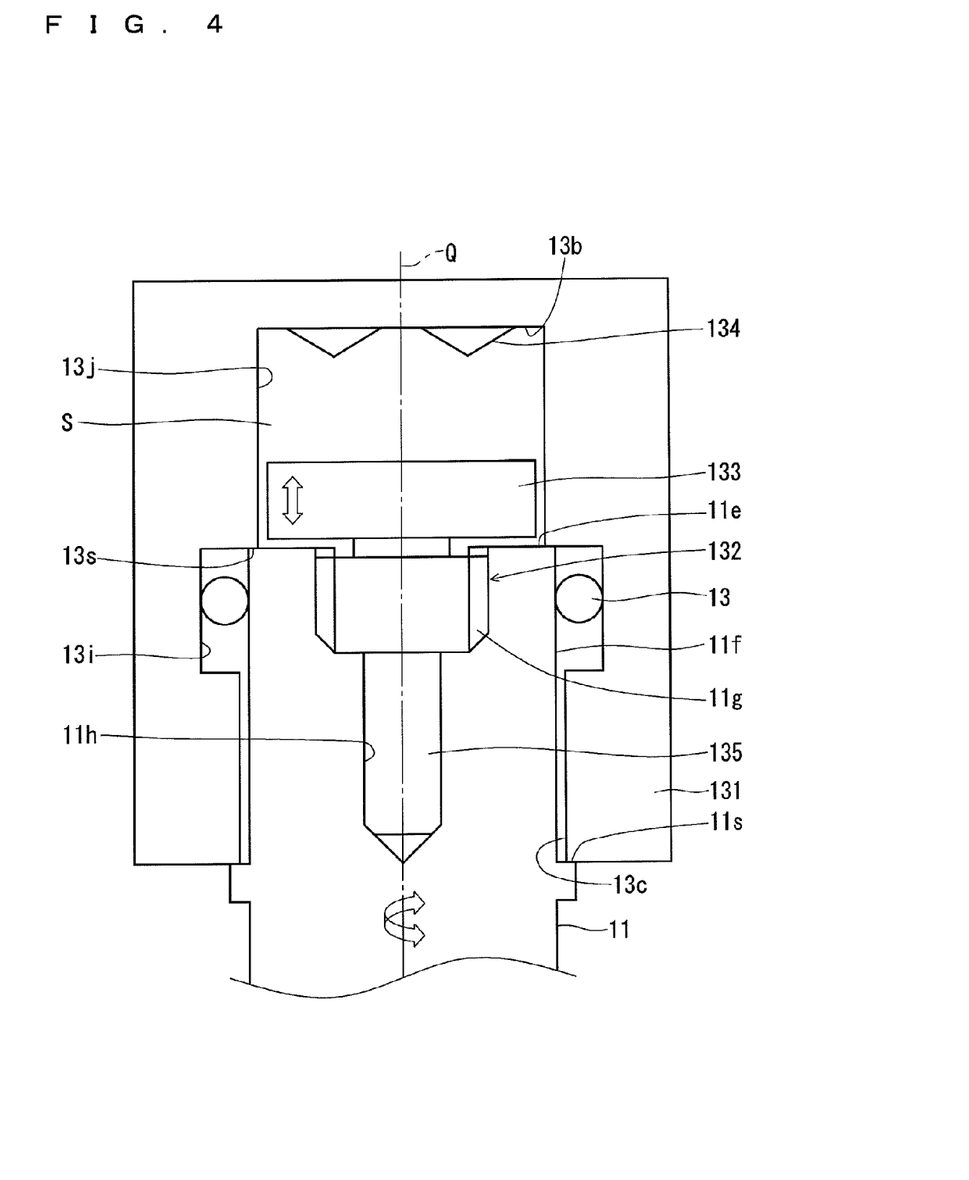
FIG. 4 is a diagram showing a cross-section in a case of reverse rotation of the bearing shown in FIG. 3.
Figure 5:
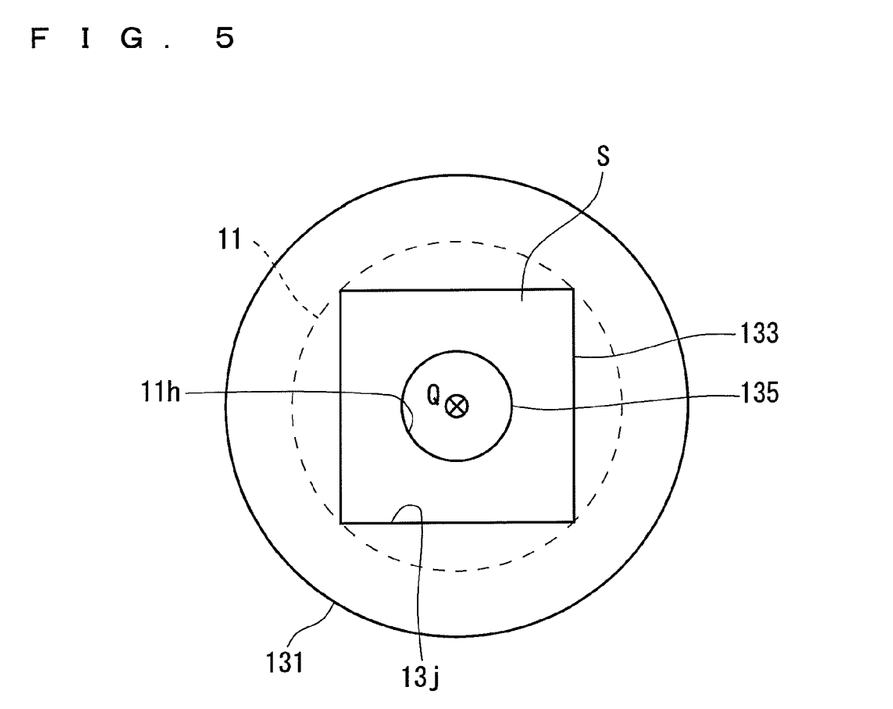
FIG. 5 is a diagram corresponding to FIG. 4 as viewed from a bearing side in an axial direction.

As shown in FIG. 5, an end portion of the male screw 132 at the side facing the bottom surface 13b has a rectangular prismatic body 133 that is opposed to the rectangular shape with a predetermined gap therebetween, where the space S shows the rectangular shape in a plane having a normal line extending in the direction of the rotation axis Q. Here, the "predetermined gap" means a gap having such a size that, when the rectangular prismatic body 133 rotates around the rotation axis Q within the space S, the angle of the rotation is limited to a predefined small angle or less. In FIGS. 3 and 4, the male screw 132 is shown in a side view.

The length of the male screw 132 including the rectangular prismatic body 133 with respect to the direction of the rotation axis Q is shorter than the length of the space S with respect to the direction of the rotation axis Q. When the shaft 11 rotates in a desired direction, the male screw 132 is released from the female screw portion 11g, and when the shaft 11 rotates in the direction reverse to the desired direction, the male screw 132 is threadedly fastened to the female screw portion 11g.

A bias portion 134 for biasing in the direction of the rotation axis Q is provided on the bottom surface 13b. In a state where the male screw 132 is released from the female screw portion 11g, the bias portion 134 biases the male screw 132 toward the shaft 11. Due to this bias portion 134, when the shaft 11 reversely rotates, the male screw 132 quickly starts to be threadedly fastened to the female screw portion 11g. If the shaft 11 rotates properly in a desired direction, the female screw portion 11g and the male screw 132 are released from each other, which can be considered that the male screw 132 is biased away from the female screw portion 11g along the direction of the rotation axis Q. That is, when the shaft 11 properly rotates, the male screw 132 is fixed substantially in place while slightly vibrating within the space S by the female screw portion 11g and the bias portion 134.

The male screw 132 also has, at the side thereof opposite to the rectangular prismatic body 133 with respect to the direction of the rotation axis Q, a circular column 135 centered at the rotation axis Q having a predetermined length and having a diameter smaller than that of the female screw portion 11g. The female screw portion 11g has a hole 11h into which the circular column 135 can be loosely inserted. Even while the male screw 132 is completely released from the threaded engagement with the female screw portion 11g, a part of the circular column 135 is held in the hole 11h. This can prevent the rotation axis of the male screw 132 from deviating from the rotation axis Q (that is, the central axis of the female screw portion 11g) of the shaft 11 within the space S. In other words, the hole 11h and the circular column 135 guide a direction of movement of the male screw 132.

In this embodiment, the depth of the female screw portion 11g is limited to a predetermined depth. Therefore, even if the male screw 132 is threadedly fastened to the female screw portion 11g due to the reverse rotation of the shaft 11, the movement of the male screw 132 in the direction of the rotation axis Q is limited to a certain distance. Thus, as shown in FIG. 3, the threaded fastening is stopped at a time point when a distal end of the male screw 132 reaches the deepest in the female screw portion 11g.

The rectangular prismatic body 133 faces an inside wall 13j (which is an inside wall located closer to the bottom surface 13b side than the inside wall 13i is) of the space S with a predetermined gap therebetween. Accordingly, simultaneously with the stopping of the threaded fastening, the male screw 132 and the shaft support portion 131, and more specifically the rectangular prismatic body 133 shown by the male screw 132 and the inside wall 13j of the recess 13c shown by the shaft support portion 131, are fixed to each other, as shown in FIG. 5. That is, the shaft 11 reversely rotates only while the female screw portion 11g and the male screw 132 are being threadedly fastened to each other. On and after reaching the deepest in the female screw portion 11g, the reverse rotation is stopped to prevent any more reverse rotation. Even after the shaft 11 stops its reverse rotation, if the shaft 11 rotates in a proper direction, the female screw portion 11g and the male screw 132 rotate in a direction of being released from each other. In FIGS. 3 and 4, the arrow indicating the rotation of the shaft 11 and the arrow indicating the vertical movement of the rectangular prismatic body 133 in the direction of the rotation axis Q are shown.

As described above, the reverse rotation prevention mechanism is provided, and therefore even when the way of connection is changed such that the field element 14 can reversely rotate during the plug-in operation, the field element 14 does not reversely rotate. This avoids or suppresses a damage to the three-phase rotary electric machine 10 which would be provoked during the plug-in operation. Additionally, since the rotation of the field element 14 is suppressed, excessive power supply to the first to third windings 12A, 12B, and 12C is avoided. Thus, the load 50 is operated in an efficient manner Embodiment 2

Here, with reference to the drawings, a description will be given to an embodiment 2, and mainly to an embodiment in which, prior to the plug-in operation, the phase of the current flowing in the first to third windings 12A, 12B, and 12C during the normal operation is determined, and the connection for the plug-in operation is switched based on a result of the determination. Configurations having the same functions as those of the embodiment 1 will be denoted by the same reference numerals, without a description thereof.

Figure 6:
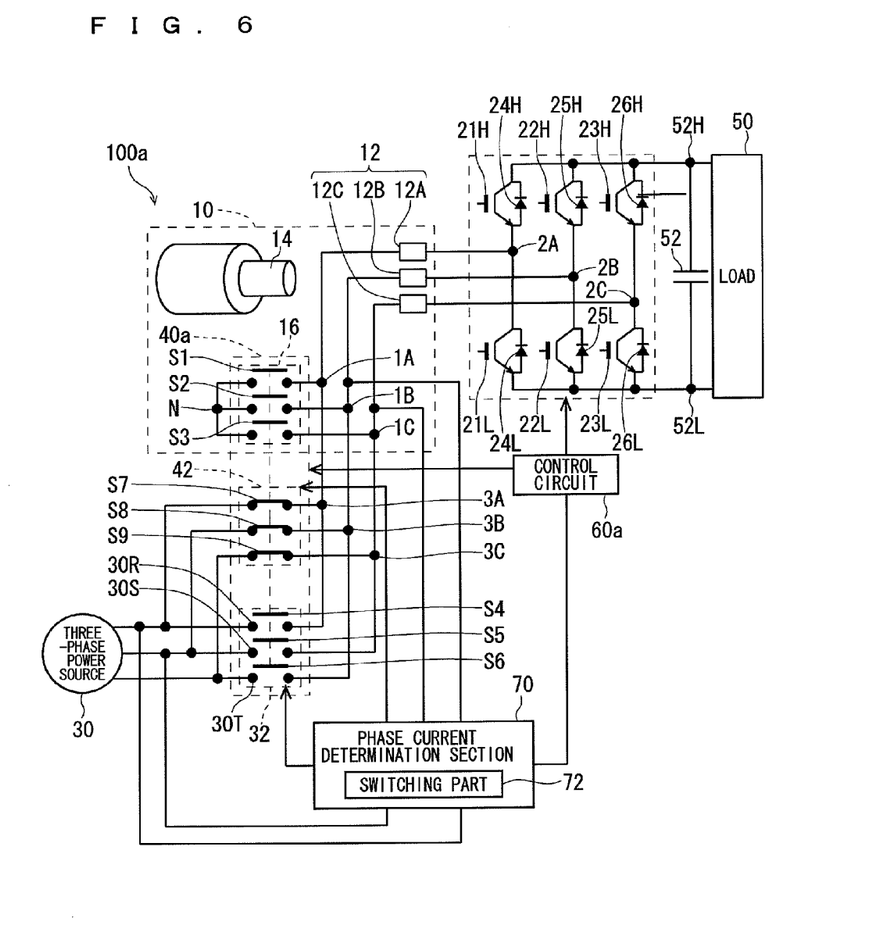
FIG. 6 is a diagram conceptually illustrating a hybrid electric-power supply system according to an embodiment 2.

In order to perform a driving for rotating the field element 14 in the reverse direction (reverse to the direction in the normal operation) that causes the reverse-rotation prevention mechanism to function during the plug-in operation, it is necessary that the rotation direction in the normal operation is determined to be one direction. It is accordingly necessary to understand how the phases of the three-phase power source 30 are connected to the first to third windings 12A, 12B, and 12C. Thus, in a hybrid electric-power supply system 100a according to the embodiment 2, as shown in FIG. 6, a third switching circuit 42 and a phase current determination section 70 are additionally provided in the hybrid electric-power supply system 100 of the embodiment 1 described above.

The third switching circuit 42 cooperates with the first switching circuit 16 and the second switching circuit 32 to function as a connecting part 40a. The third switching circuit 42 has switches S7, S8, and S9. The switch S7 is provided between the first terminal 30R of the three-phase power source 30 and a relay point 3A relaying the one end 1A of the first winding 12A and the switch S4 to each other. The switch S8 is provided between the second terminal 30S of the three-phase power source 30 and a relay point 3B relaying the one end 1B of the second winding 12B and the switch S6 to each other. The switch S9 is provided between the third terminal 30T of the three-phase power source 30 and a relay point 3C relaying the one end 1C of the third winding 12C and the switch S5 to each other.

By bringing all the switches S7, S8, and S9 into the conducting state while bringing all the other switches (in this embodiment 2, the switches S1, S2, and S3 of the first switching circuit 16 and the switches S4, S5, and S6 of the second switching circuit 32) into the non-conducting state, a third state, in addition to the first state and the second state, can be obtained where the three-phase AC power of the three-phase power source 30 is supplied to the converter 20. The connecting part 40a selects the second state and the third state in a mutually exclusive manner. The phases of the three-phase AC power supplied to the converter 20 in the third state and the phases of the three-phase AC power supplied to the converter 20 in the second state of the embodiment 1 described above, are different from each other in that, for example, the S-phase and the T-phase are interchanged. That is, when the connecting part 40a switches between the second state and the third state, the field element 14 during the plug-in operation is driven in rotation directions opposite to each other.

When the hybrid electric-power supply system 100a, which now has the reverse-rotation prevention mechanism, is driven in rotation in the direction reverse to the direction in the normal operation by being switched to either one of the second state or the third state at the beginning of the plug-in operation, the reverse-rotation prevention mechanism operates to prevent rotation of the field element 14. In other words, during the plug-in operation, by selecting the second state or the third state where the field element 14 is driven in rotation in the reverse direction, the reverse-rotation prevention mechanism prevents reverse rotation of the field element 14 and thus excessive power supply to the first to third windings 12A, 12B, and 12C can be avoided. Therefore, the phases of the first to third windings 12A, 12B, and 12C during the normal operation are determined, and, based on a result of the determination, either one of the second state and the third state is selected in the plug-in operation such that the phases of the first to third windings 12A, 12B, and 12C are interchanged.

The phase current determination section 70 determines the phases of the currents flowing in the first to third windings 12A, 12B, and 12C. In accordance with a result of the determination, the phase current determination section 70 gives an instruction causing the connecting part 40a to select either one of the second state and the third state during the plug-in operation.

Figure 7:
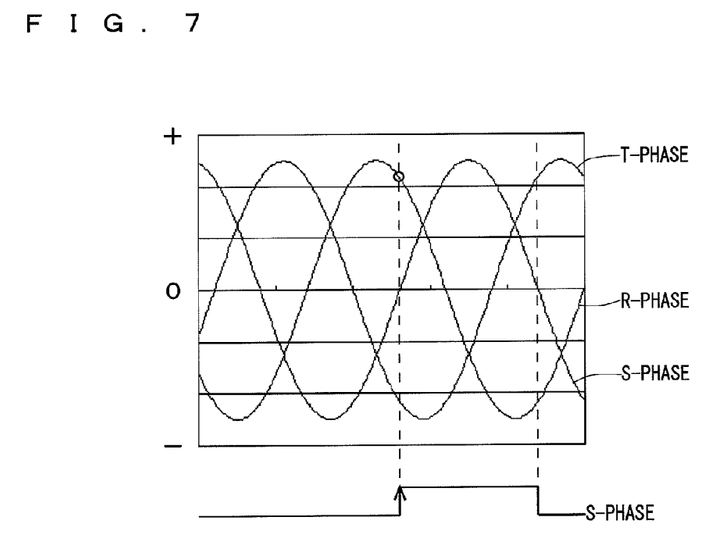
FIG. 7 is a diagram for explaining an operation of a phase current determination section.

To be specific, the phase current determination section 70 detects or stores the phases of the first to third terminals 30R, 30S, and 30T of the three-phase power source 30, detects a point (rising edge) at which the sign of the phase current in the second winding 12B during the normal operation changes from negative to positive as shown in FIG. 7, and determines the phase in accordance with the sign of the phase current in the third winding 12C at that point of time. More specifically, when the phase current in the second winding 12B is defined as the S-phase current for descriptive purposes, the sign of the phase current in the third winding 12C at the rising edge of this S-phase current is determined. If this sign is positive, it is considered that the R-phase current is flowing in the third winding 12C, and thus it is determined that the phases of the first to third windings 12A, 12B, and 12C are T, S, and R, respectively. If this sign is negative, it is considered that the T-phase current is flowing in the third winding 12C, and thus it is determined that the phases of the first to third windings 12A, 12B, and 12C are R, S, and T, respectively.

In a case where, during the normal operation, the R-phase current, the S-phase current, and the T-phase current flow in the first to third windings 12A, 12B, and 12C, respectively, a switching part 72 and a control circuit 60a, at the time of starting the plug-in operation, bring all the switches S4, S5, and S6 of the second switching circuit 32 into the conducting state while bringing all the switches S1, S2, and S3 of the first switching circuit 16 and the switches S7, S8, and S9 of the third switching circuit 42, into the non-conducting state (that is, establish the second state) to perform the plug-in operation. As a result, during the plug-in operation, the R-phase, T-phase, and S-phase currents flow in the first to third windings 12A, 12B, and 12C, respectively, so that the field element 14 is driven in rotation in the direction reverse to the direction in the normal operation.

In a case where, during the normal operation, the T-phase current, the S-phase current, and the R-phase current flow in the first to third windings 12A, 12B, and 12C, respectively, the switching part 72 and the control circuit 60a, at the time of starting the plug-in operation, bring all the switches S7, S8, and S9 of the third switch 42 into the conducting state while bringing all the switches S1, S2, and S3 of the first switching circuit 16 and the switches S4, S5, and S6 of the second switching circuit 32, into the non-conducting state (that is, establish the third state) to perform the plug-in operation. As a result, during the plug-in operation, the R-phase, S-phase, and T-phase currents flow in the first to third windings 12A, 12B, and 12C, respectively, so that the field element 14 is driven in rotation in the direction reverse to the direction in the normal operation.

In short, the phase current determination section 70 causes the control circuit 60a to make a control such that the S-phase and the T-phase are interchanged in the second state and in the third state. As described above, as long as the hybrid electric-power supply system 100a has the phase current determination section 70, the connection that allows the field element 14 to reversely rotate during the plug-in operation can be established, irrespective of whether the phases of the currents flowing in the armature 12 are the R, S, and T, or the T, S, and R, by using the rotation of the field element 14 that serves as the rotor in the normal operation.

At this time, the phase current determination section 70 causes the control circuit 60a to make a control so as to interchange the S-phase and the T-phase of the high-arm side switching devices 21H to 23H and the low-arm side switching devices 21L to 23L, and more specifically, controls an output of the gate signal of the converter 20.

<Modification>

Although some preferred embodiments of the present invention have been described above, the present invention is not limited thereto. For example, in the embodiments 1 and 2 described above, the converter 20 is formed with the switching devices and the diodes, but it may be a rectifier formed with diodes. The three-phase rotary electric machine 10 is not limited to an axial gap type motor, and may be a radial gap type motor. The reverse rotation prevention mechanism detailed in the embodiment 1 above is merely illustrative, and other mechanisms may be adoptable to prevent the reverse rotation.

While the invention has been described in detail, the foregoing description is in all aspects illustrative and not restrictive. It is therefore understood that numerous modifications and variations can be devised without departing from the scope of the invention.

DESCRIPTION OF THE REFERENCE NUMERALS 100, 100a hybrid electric-power supply system
10 three-phase rotary electric machine
11 shaft
11e end portion
11g thread
12 armature
12A, 12B, 12C winding
13 bearing
131 shaft support portion
132 threaded member
14 field element
20 converter
30 three-phase power source
40, 40a connecting part

The invention claimed is:

1. A hybrid electric-power supply system comprising:
a three-phase rotary electric machine including an armature serving as a stator and a field element serving as a rotor, said armature having first to third windings corresponding to first to third different phases, respectively;
a converter connected to said windings;
a three-phase power source including first to third terminals for supplying currents corresponding to said first to third phases, respectively; and
a connecting part for switching between a first state where said first to third windings are commonly connected to one another at the side thereof opposite to said converter, and a second state where said first terminal, said third terminal, and said second terminal are connected to said first winding, said second winding, and said third winding, respectively,
wherein
said first to third windings are not connected to one another within said three-phase rotary electric machine, in said first state, power is fed to said converter by a normal rotation of said rotor, and in said second state, power is fed from said three-phase power source to said converter via said first to third windings.

2. The hybrid electric-power supply system according to claim 1, wherein
said connecting part switches among said first state, said second state, and a third state where said first terminal, said second terminal, and said third terminal are connected to said first winding, said second winding, and said third winding, respectively,
in said third state, power is fed from said three-phase power source to said converter via said first to third windings,
said hybrid electric-power supply system further comprises:
a phase current determination section for determining phase currents that flow in said first to third windings, respectively, due to rotation of said field element; and
a switching part for, when power is fed from said three-phase power source to said converter via said first to third windings, switching said connecting part to said second state or said third state based on a result of the determination made by said phase current determination section.

3. The hybrid electric-power supply system according to claim 1, wherein
said field element is fixed to a bearing, said bearing includes:
a shaft support portion for supporting a shaft that extends in a direction of a rotation axis and has, in an end portion thereof at one side with respect to said direction of the rotation axis, a thread threaded around said direction of rotation axis, said supporting is made so as to fix a position of said shaft with respect to said direction of the rotation axis and a direction perpendicular thereto while allowing said shaft to rotate around said rotation axis; and
a threaded member threadedly fastened to and released from said thread, said threaded member has its position fixed relative to said shaft support portion with respect to a circumferential direction centered at said rotation axis while said threaded member is allowed to move in said direction of the rotation axis only to a certain distance.

4. The hybrid electric-power supply system according to claim 2, wherein
said field element is fixed to a bearing, said bearing includes:
a shaft support portion for supporting a shaft that extends in a direction of a rotation axis and has, in an end portion thereof at one side with respect to said direction of the rotation axis, a thread threaded around said direction of rotation axis, said supporting is made so as to fix a position of said shaft with respect to said direction of the rotation axis and a direction perpendicular thereto while allowing said shaft to rotate around said rotation axis; and
a threaded member threadedly fastened to and released from said thread, said threaded member has its position fixed relative to said shaft support portion with respect to a circumferential direction centered at said rotation axis while said threaded member is allowed to move in said direction of the rotation axis only to a certain distance.

* * * * *